United States Patent
Bubb et al.

(10) Patent No.: US 8,992,821 B2
(45) Date of Patent: Mar. 31, 2015

(54) PASS-THROUGH CATALYTIC SUBSTRATE INCLUDING POROUS CERAMIC BEVELED CORNER PORTIONS AND METHODS

(71) Applicant: Corning Incorporated, Corning, NY (US)

(72) Inventors: Keith Norman Bubb, Beaver Dams, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/518,549

(22) Filed: Oct. 20, 2014

(65) Prior Publication Data
US 2015/0038323 A1 Feb. 5, 2015

Related U.S. Application Data

(63) Continuation of application No. 13/307,818, filed on Nov. 30, 2011, now Pat. No. 8,865,084.

(51) Int. Cl.
*B28B 1/00* (2006.01)
*B05D 5/00* (2006.01)
*B01J 35/04* (2006.01)
(Continued)

(52) U.S. Cl.
CPC ............. *B01J 37/0009* (2013.01); *B01J 35/04* (2013.01); *B01J 35/1071* (2013.01); *B01J 35/1076* (2013.01)
USPC .......................................... 264/630; 427/243

(58) Field of Classification Search
USPC ............. 422/177, 180; 427/243, 244; 428/60, 428/73, 116; 55/523; 502/100; 264/630
See application file for complete search history.

(56) References Cited

U.S. PATENT DOCUMENTS

| 4,233,351 A | 11/1980 | Okumura et al. ............. 428/116 |
| 4,335,023 A | 6/1982 | Dettling et al. ......... 252/466 PT |

(Continued)

FOREIGN PATENT DOCUMENTS

| EP | 0 867 223 | 9/1998 |
| EP | 1 249 262 | 10/2002 |

(Continued)

OTHER PUBLICATIONS

Patent Cooperation Treaty International Notification of Transmittal of the International Search Report and The Written Opinion of the International Searching Authority, international application No. PCT/US2012/067158; mailing date May 7, 2013, 17 pages.

*Primary Examiner* — Tom Duong
(74) *Attorney, Agent, or Firm* — Joseph M. Homa

(57) ABSTRACT

A pass-through catalytic substrate can comprise a plurality of porous ceramic substrate walls defining flow channels extending between an inlet end and an outlet end of the catalytic substrate. The pass-through catalytic substrate can include a plurality of porous ceramic beveled corner portions positioned at intersecting corners of the substrate walls within the flow channels. In one example, the porous ceramic beveled corner portions each include a heat capacity less than about 1.38 J/cm$^3$/K. In another example, a catalytic washcoat layer can be provided for coating the porous ceramic substrate walls and the porous ceramic beveled corner portions. Methods for producing a pass-through catalytic substrate also provide porous ceramic beveled corner portions.

9 Claims, 10 Drawing Sheets

(51) Int. Cl.
  *B01J 35/10*     (2006.01)
  *B01J 37/00*     (2006.01)

(56) References Cited

U.S. PATENT DOCUMENTS

| | | | |
|---|---|---|---|
| 5,456,965 A | 10/1995 | Machida et al. | 428/116 |
| 5,731,562 A | 3/1998 | Beckmeyer et al. | 219/69.12 |
| 6,149,877 A | 11/2000 | Ogai | 422/180 |
| 6,159,431 A | 12/2000 | Inoue et al. | 422/180 |
| 6,713,429 B1 | 3/2004 | Tanaka et al. | 502/527.19 |
| 6,803,087 B2 | 10/2004 | Brew et al. | 428/116 |
| 7,247,184 B2 | 7/2007 | Frost | 55/523 |
| 7,326,270 B2 | 2/2008 | Hong et al. | 55/523 |
| 7,374,729 B2 | 5/2008 | Chen et al. | 422/177 |
| 7,393,377 B2 | 7/2008 | Kasai et al. | 55/523 |
| 7,601,194 B2 | 10/2009 | Beall et al. | 55/523 |
| 7,785,695 B2 | 8/2010 | Ohno et al. | 428/116 |
| 7,857,885 B2 | 12/2010 | Hong et al. | 55/523 |
| 7,875,573 B2 | 1/2011 | Beutel et al. | 502/339 |
| 7,947,238 B2 | 5/2011 | Deeba | 423/213.2 |
| 2003/0061860 A1 | 4/2003 | Hu et al. | 73/23.31 |
| 2004/0161583 A1 | 8/2004 | Brew et al. | 428/116 |
| 2005/0274097 A1 | 12/2005 | Beall et al. | 55/523 |
| 2007/0148406 A1 | 6/2007 | Ando et al. | 428/118 |
| 2007/0231538 A1 | 10/2007 | Hirakawa et al. | 428/116 |
| 2008/0317999 A1 | 12/2008 | Patchett et al. | 428/116 |
| 2010/0160158 A1 | 6/2010 | Ando et al. | 502/439 |
| 2010/0166629 A1 | 7/2010 | Deeba | 423/213.5 |

FOREIGN PATENT DOCUMENTS

| | | |
|---|---|---|
| EP | 1 413 344 | 4/2004 |
| WO | 2007/040348 | 4/2007 |

US 8,992,821 B2

PASS-THROUGH CATALYTIC SUBSTRATE INCLUDING POROUS CERAMIC BEVELED CORNER PORTIONS AND METHODS

CROSS-REFERENCE TO RELATED APPLICATIONS

This application is a continuation of and claims the benefit of priority to U.S. patent application Ser. No. 13/307,818, filed on Nov. 30, 2011, the content of which is relied upon and incorporated herein by reference in its entirety.

FIELD

The present disclosure relates generally to apparatus and methods for producing a pass-through catalytic substrate and, more particularly, to apparatus and methods for producing a pass-through catalytic substrate that includes porous ceramic beveled corner portions.

BACKGROUND

Apparatus and methods are known to produce pass-through catalytic substrates for treating exhaust from gasoline and diesel fueled internal combustion engines. It is known to provide a honeycomb substrate with catalyst coatings within the flow channels of the substrate. In operation, exhaust gas is forced to pass through the flow channels of the substrate. When passing through the flow channels, pollutants like unburned hydrocarbons, carbon monoxide, nitric and nitrous oxides react on catalysts in the washcoatings to form innocuous species like nitrogen, carbon dioxide, and water before the exhaust is released to the atmosphere.

During a typical engine start up, a significant amount of time may pass before the pass-through catalytic substrate is heated to a temperatures where the catalyst is active and capable of processing the pollutants. Consequently, a significant amount of pollution escapes immediately after the engine is started and before the substrate reaches the light-off temperature. As such, in order to reduce excess pollution during engine start-up, there is a desire to provide pass-through catalytic substrates to support the catalyst washcoatings that can be quickly heated to reduce the time necessary to reach the light-off temperature.

SUMMARY

The following presents a simplified summary of the disclosure in order to provide a basic understanding of some example aspects described in the detailed description.

In one example aspect, a pass-through catalytic substrate comprises a plurality of porous ceramic substrate walls defining flow channels extending between an inlet end and an outlet end of the catalytic substrate. The pass-through catalytic substrate further includes a plurality of porous ceramic beveled corner portions positioned at intersecting corners of the substrate walls within the flow channels, wherein the porous ceramic beveled corner portions each have a heat capacity less than about 1.38 J/cm$^3$/K. The pass-through catalytic substrate also includes a catalytic washcoat layer coating the porous ceramic substrate walls and the porous ceramic beveled corner portions.

In another example aspect, a method of making a pass-through catalytic substrate comprises the steps of extruding a ceramic-forming batch material through a die to form a ceramic-forming substrate including a plurality of substrate walls defining flow channels extending between an inlet end and an outlet end of the ceramic-forming substrate, wherein a plurality of beveled corner portions are coextruded with the plurality of substrate walls. The method further includes the step of firing the ceramic-forming substrate into a porous ceramic substrate, wherein the beveled corner portions comprise porous ceramic including a heat capacity less than about 1.38 J/cm$^3$/K. The method also includes the step of coating the porous ceramic substrate walls and the porous ceramic beveled corner portions with a catalytic washcoat layer.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
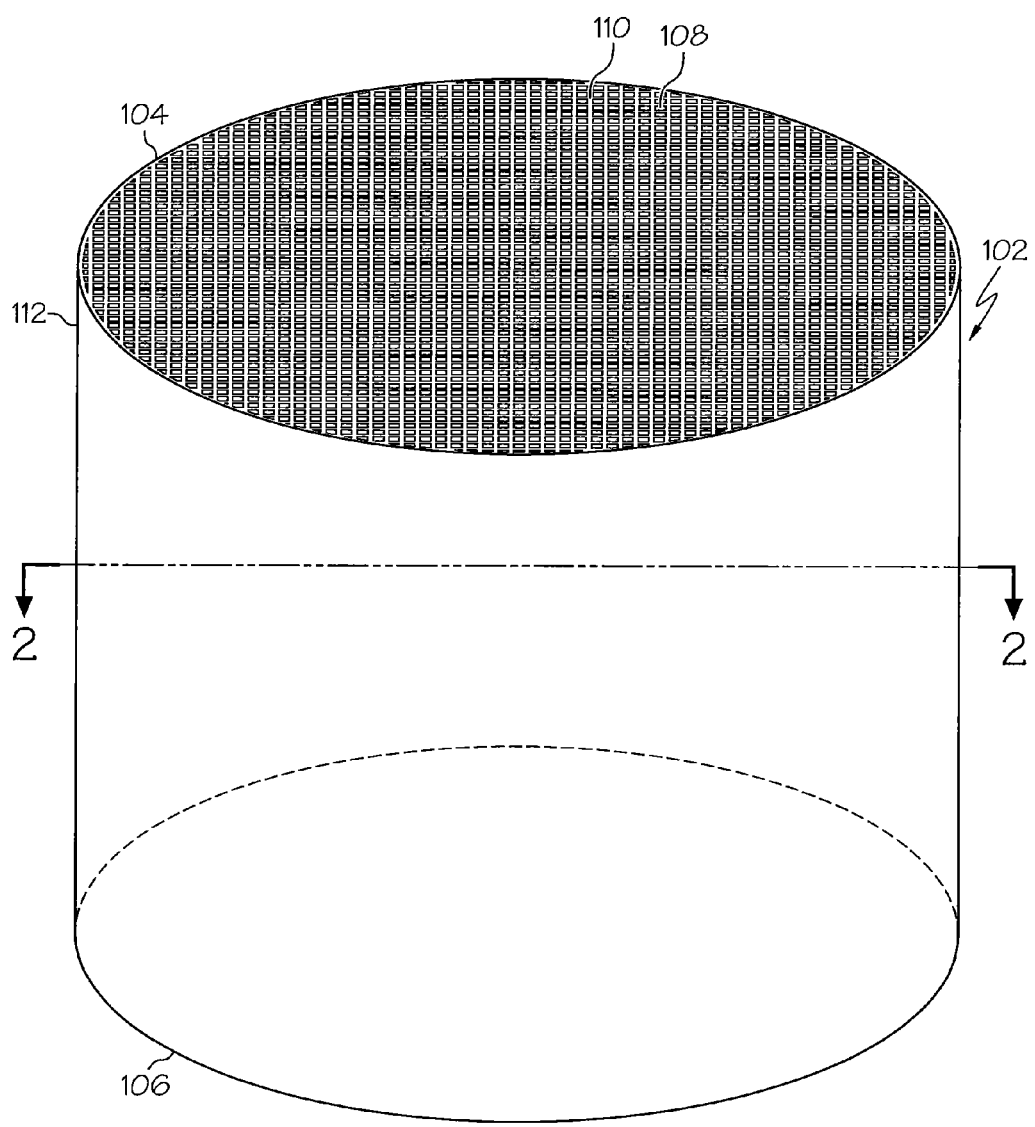
FIG. 1 is a perspective view of a pass-through catalytic substrate in accordance with aspects of the disclosure.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

FIG. 1 illustrates a perspective schematic view of a pass-through catalytic substrate 102. The pass-through catalytic substrate 102 is not necessarily drawn to scale and illustrates only one example schematic representation of a pass-through catalytic substrate 102. The pass-through catalytic substrate 102 includes an inlet end 104 and an outlet end 106 positioned opposite from the inlet end 104. A plurality of flow channels 108 extend between the inlet end 104 and outlet end 106. In one example, substantially all of the flow channels 108 are not plugged and therefore provide for an unobstructed pass flow from the inlet end 104 to the outlet end 106 of the pass-through catalytic substrate 102.

Figure 2:
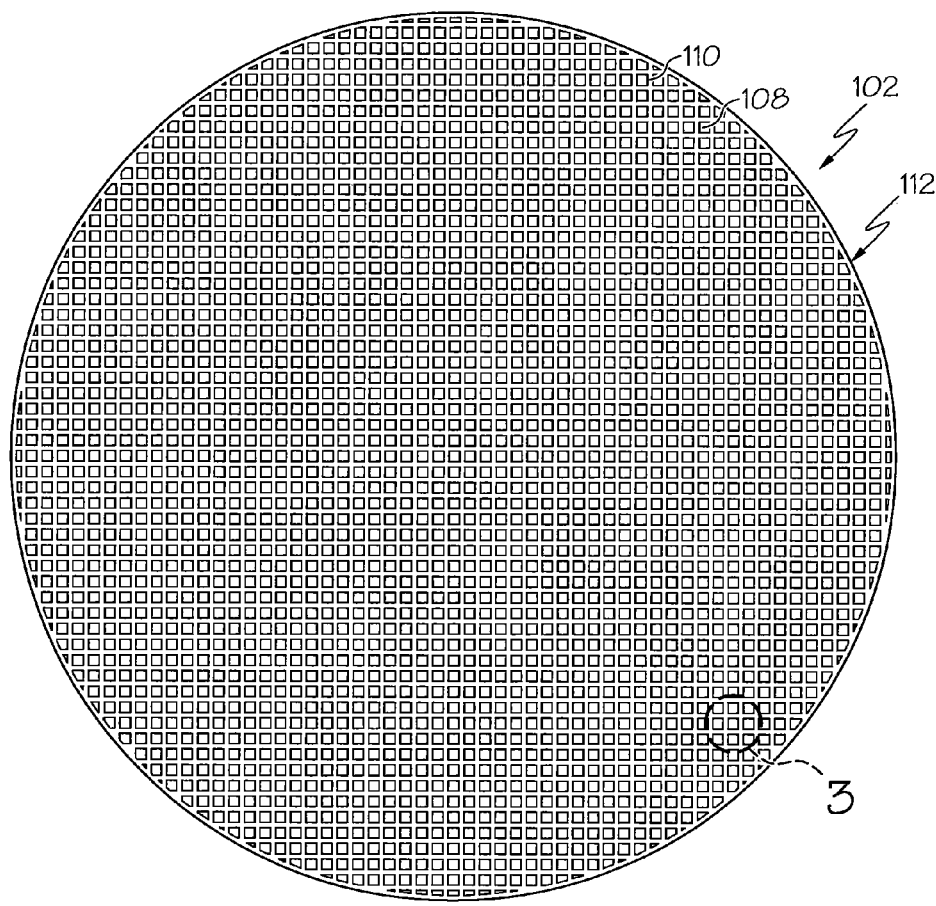
FIG. 2 is a schematic sectional view of the pass-through catalytic substrate along line 2-2 of FIG. 1.

As shown in FIG. 2, the flow channels 108 can be formed by a plurality of porous ceramic substrate walls 110 extending longitudinally between the inlet end 104 and outlet end 106 of the pass-through catalytic substrate 102. The porous ceramic substrate walls 110 can include a range of cross-sectional wall thicknesses from about 30 μM to about 150 μm, such as from about 50 μm to about 100 μm. In further examples, the porous ceramic substrate walls 110 can include substantially the same wall thickness through the length of the pass-through catalytic substrate 102 from the inlet end 104 to the outlet end 106.

The flow channels 108 and porous ceramic substrate walls 110 can each extend in a substantially parallel orientation longitudinally between the inlet end 104 and outlet end 106. An outer surface 112 can surround the flow channels 108 and porous ceramic substrate walls 110. The outer surface 112 can extend longitudinally between the inlet end 104 and outlet end 106. As shown, the outer surface 112 can comprise a circular cylindrical shape having a circular cross-sectional profile. In further examples, the outer surface 112 may have an elliptical, polygonal or other shape. For example, although not shown, the outer surface 112 may have a polygonal shape such as triangular, rectangular (e.g., square) or other polygonal shape. Moreover, as shown, the pass-through catalytic substrate 102 can comprise a single monolithic substrate although the substrate may comprise a segmented substrate wherein many substrates are mounted parallel to one another to provide the desired overall cross sectional configuration. Whether a single monolithic or segmented substrate, various geometries may be incorporated in accordance with aspects of the disclosure. For example, the substrates may comprise a rectangular (e.g., square) cross-sectional outer periphery or other polygonal shape having three or more sides. In further examples, the substrates may have an outer cross-sectional periphery that is circular, oval, or other curved shape.

FIG. 2 illustrates an example schematic sectional view of the pass-through catalytic substrate 102 along line 2-2 of FIG. 1. The pass-through catalytic substrate 102 can have a variety of cell densities, such that a larger or smaller number of flow channels 108 can be provided per unit area. For instance, the cell density can be in the range of from about 100 to 1000 channels/inch$^2$ of pass-through catalytic substrate 102 cross-section. As such, the examples shown in FIGS. 1 and 2 are not intended to be limiting, as a range of cell densities are envisioned.

Figure 3:
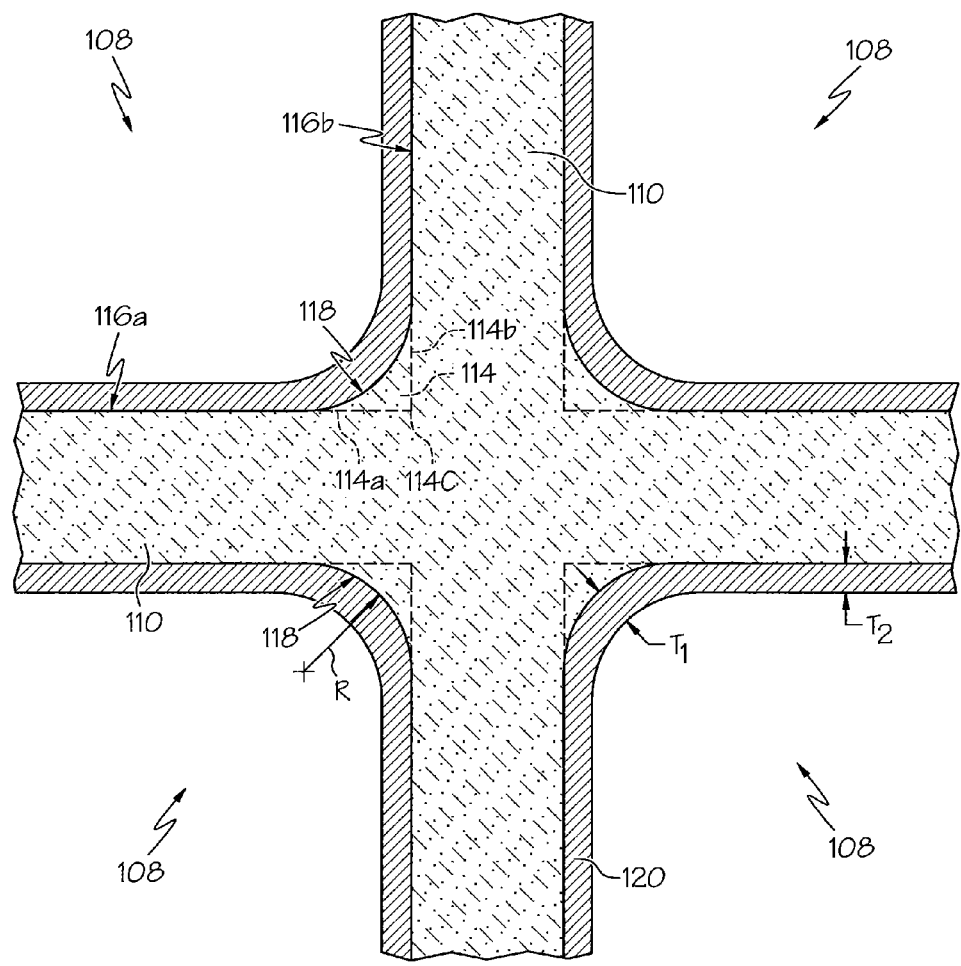
FIG. 3 is an enlarged view of an example beveled corner portion of the pass-through catalytic substrate taken at view 3 of FIG. 2.
Figure 4:
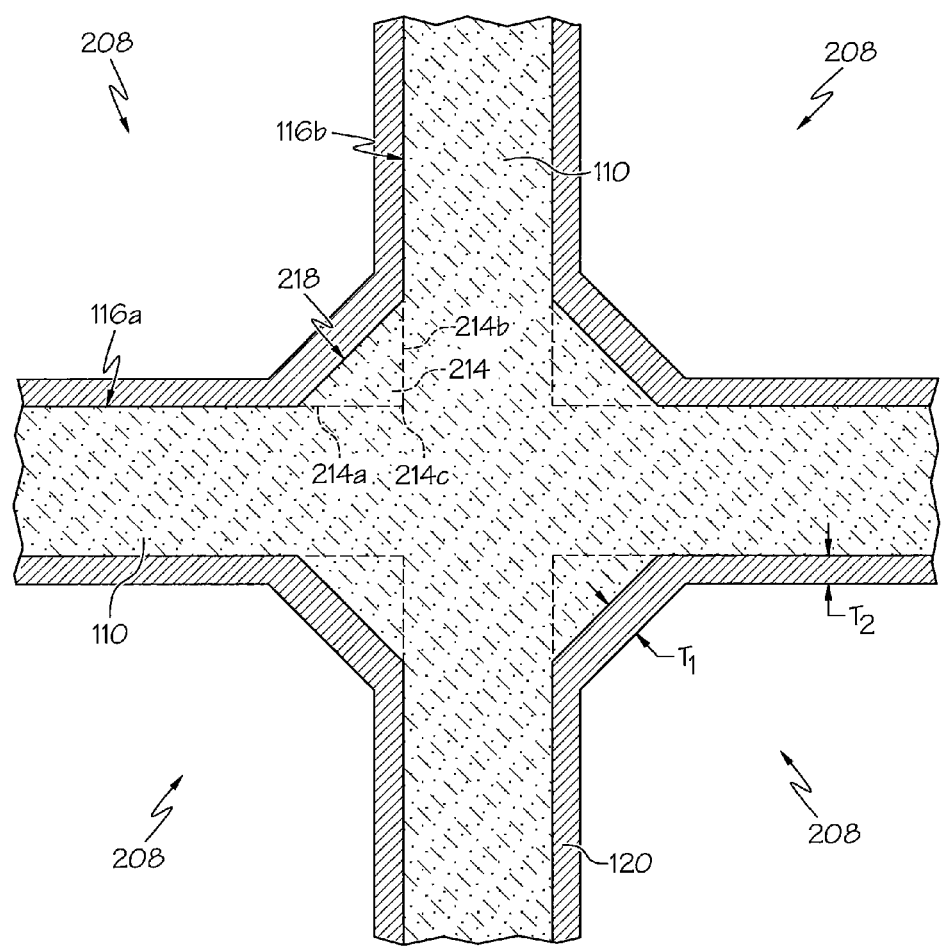
FIG. 4 is an enlarged view of a second example beveled corner portion of the pass-through catalytic substrate taken at view 3 of FIG. 2.

In further examples, the cell constructions forming the flow channels can have different configurations. For instance, as shown in FIGS. 3 and 4, the arrangement of cells shown in FIG. 2 is a generally rectangular, such as a square, configuration although further examples may have cell structures with a triangular, or other polygonal configuration. Examples of the present disclosure include a plurality of porous ceramic beveled corner portions positioned at intersecting corners of the substrate walls within the flow channels.

FIG. 3 is an enlarged view of a portion of FIG. 2 illustrating just one possible construction of the flow channels 108. In the illustrated example, porous ceramic beveled corner portions 114 are positioned at intersecting corners of the porous ceramic substrate walls 110 within the flow channels 108. The porous ceramic beveled corner portion 114 can be defined by projecting a first plane 114a from a first wall surface 116a of the adjacent porous ceramic substrate wall 110 and a second plane 114b projecting from a second wall surface 116b of another adjacent porous ceramic substrate wall 110. The first and second planes 114a, 114b intersect with one another along an axis 114c wherein the corresponding porous ceramic beveled corner portion 114 is defined by the area between the first plane 114a, the second plane 114b and an interior beveled surface 118.

FIG. 4 is another enlarged view of a portion of FIG. 2 illustrating another one of many possible constructions of flow channels 208 similar to the flow channels 108 discussed above. FIG. 4 shows example porous ceramic beveled corner portions 214 positioned at intersecting corners of the porous ceramic substrate walls 110 within the flow channels 208. The illustrated example porous ceramic beveled corner portion 214 can be defined by projecting a first plane 214a from the first wall surface 116a of the adjacent porous ceramic substrate wall 110 and a second plane 214b projecting from the second wall surface 116b of another adjacent porous ceramic substrate wall 110. The first and second planes 214a, 214b intersect with one another along an axis 214c wherein the corresponding porous ceramic beveled corner portion 214 is defined by the area between the first plane 214a, the second plane 214b and an interior beveled surface 218.

For illustration purposes, FIGS. 3 and 4 shows one porous ceramic beveled corner portion 114, 214 of each of four corresponding adjacent flow channels 108, 208. For illustrative purposes, a single porous ceramic beveled corner portion 114, 214 is shown associated with each corresponding flow channel 108, 208 with the understanding that all four porous ceramic beveled corner portions 114, 214 of each corresponding flow channel 108, 208 may be substantially identical to one another. Moreover, as shown, the four porous ceramic beveled corner portions 114, 214 of each corresponding flow channel 108, 208 may be substantially identical to the corresponding four porous ceramic beveled corner portions 114, 214 of many, such as substantially all of the porous ceramic beveled corner portions of the remaining corresponding flow channels 108, 208. In further examples, beveled corner portions of some of the flow channels may be mathematically similar to beveled corner portions of other flow channels. For instance, in some examples, the cross sectional area of central flow channels may be greater than the cross sectional area of some of the peripheral flow channels. For instance, in one example, the porous ceramic substrate walls 110 may be relatively thicker at peripheral portions of the substrate when compared to central portions of the substrate to help increase the strength of the substrate in these areas. In such examples, the porous ceramic beveled corner portions may still have cross sectional footprints that are mathematically similar to one another.

The porous ceramic beveled corner portions 114, 214 can extend partially or completely along the entire length of the pass-through catalytic substrate 102 between the inlet end 104 and the outlet end 106. In addition, the porous ceramic beveled corner portions 114, 214 can be formed integrally with the porous ceramic substrate walls 110, such that the porous ceramic beveled corner portions 114, 214 can be formed from the same material as the porous ceramic substrate walls 110.

The porous ceramic substrate walls 110 and porous ceramic beveled corner portions 114, 214 can be formed from a number of different materials, including cordierite. Furthermore, the porous ceramic substrate walls 110 can porous ceramic beveled corner portions 114, 214 may be formed by the same material (e.g., cordierite material) that may have substantially the same pore distribution characteristics although further examples may provide the porous ceramic beveled corner portions 114, 214 with a different pore distribution than the pore distribution of the porous ceramic substrate walls 110.

In some examples, both the porous ceramic substrate walls 110 and the porous ceramic beveled corner portions 114, 214 can include a porosity in a range of from about 50% to about 75%, such as about 55% to about 65%. Furthermore, both the porous ceramic substrate walls 110 and the porous ceramic beveled corner portions 114, 214 can include a median pore size in a range of from about 0.5 µm to about 7 µm, such as from about 1 µm to about 5 µm.

The interior beveled surfaces 118, 218 of the porous ceramic beveled corner portions 114, 214 can include a wide range of surface configurations. For instance, as shown in FIG. 3, the porous ceramic beveled corner portions 114 can include a rounded, arcuate surface 118 having a concave shape although the arcuate surface 118 may include a convex or irregular surface topography in further examples. In the illustrated example, the arcuate surface 118 can include a radius of curvature ("R") in a range of from about 40 µm to about 400 µm although the radius of curvature may extend outside of this range in further examples.

In one example, arcuate surface 118 of the porous ceramic beveled corner portions 114 of the pass-through catalytic substrate 102 can have a substantially identical radius of curvature in the range of about 40 µm to about 400 µm. In further examples, the radius of curvature can vary from one flow channel to another flow channel. For example, radius of curvature "R" of the arcuate surface 118 could be increasing or decreasing along a radial axis extending towards the outer surface 112, such that one flow channel has a different radius of curvature than a second, adjacent flow channel. In this example, the radius of curvature of the arcuate surface 118 could be larger or smaller in the flow channels 108 that are closer to the outer surface 112 as compared to flow channels 108 that are closer to a longitudinal center of the pass-through catalytic substrate 102.

Referring now to FIG. 4, an enlarged view of a second example of an intersection of the porous ceramic substrate walls 110 is shown. As shown, the interior beveled surface 218 of the porous ceramic beveled corner portion 214 can further include a substantially planar surface 218 extending between intersecting wall surfaces 116a, 116b of the porous ceramic substrate walls 110. In this example, the porous ceramic beveled corner portion 214 can define a substantially triangularly shaped structure positioned in a corner of the flow channel 208 in which a hypotenuse forms the planar surface of the interior beveled surface 218. The planar surface can be substantially linear such that a cross-sectional profile of the planar surface extends in nearly a straight line between the intersecting wall surfaces 116a, 116b of the porous ceramic substrate walls 110.

In one example, all of the planar surfaces of the interior beveled surface 218 of the porous ceramic beveled corner portions 214 can have substantially identically sized and shaped planar surfaces. In further examples, the size of the planar surfaces could be larger or smaller for different flow channels 208. Accordingly, the size of the planar surfaces may be increasing or decreasing along a radial axis extending towards the outer surface 112, such that one flow channel has a larger planar surface than a second, adjacent flow channel. In this example, the size of the planar surfaces could be larger or smaller in the flow channels 208 that are closer to the outer surface 112 as compared to flow channels 208 that are closer to a longitudinal center of the pass-through catalytic substrate 102.

In other examples, the pass-through catalytic substrate 102 could include a combination of porous ceramic beveled corner portions 114, 214. As such, both the arcuate surfaces 118 and the planar surfaces 218 can be provided in the same pass-through catalytic substrate 102. For instance, one or a plurality of flow channels could include four porous ceramic beveled corner portions 114 having an interior beveled surface 118 as the illustrated arcuate surface while another or a further plurality of flow channels could include four beveled corner portions 218 having the illustrated planar surfaces. In yet another example, each of a plurality of the flow channels within the pass-through catalytic substrate 102 could include a combination of the interior beveled surfaces 118, 218 with respective arcuate and planar surfaces. Therefore, it is to be understood that a variety of combinations of the porous ceramic beveled corner portions within a single pass-through catalytic substrate 102 are envisioned.

Referring still to FIGS. 3 and 4, a catalytic washcoat layer 120 can be provided as a coating on both of the porous ceramic substrate walls 110 and the porous ceramic beveled corner portions 114, 214. The catalytic washcoat layer 120 can define a surface that the exhaust gas contacts as it flows through the pass-through catalytic substrate 102. Once the catalytic washcoat layer 120 is sufficiently heated to the light-off temperature, the catalyst within the washcoat layer can react with undesirable hydrocarbon and/or nitrogen oxide emissions from exhaust gas before the cleaned gas is released into the atmosphere.

The catalytic washcoat layer 120 can extend partially or completely along the entire length of the pass-through catalytic substrate 102 between the inlet end 104 and the outlet end 106. The catalytic washcoat layer 120 can provide for a relatively high surface area for the deposition of catalytically promoting material and can include a number of different compositions and materials. For instance, in one example, the catalytic washcoat layer 120 can include a composition of about 75% alumina, 21% ceria zirconia, and 3-4% precious metals. However, it is to be understood that the catalytic washcoat layer 120 can include different compositions in further examples. The catalytic washcoat layer 120 can be loaded onto the pass-through catalytic substrate 102 at a number of different washcoat loadings. In just one example, a washcoat loading may comprise about 0.2 g/cm$^3$ although other loadings of washcoat may be provided in further examples.

The porous ceramic substrate walls 110 and porous ceramic beveled corner portions 114, 214 of the pass-through catalytic substrate 102 can be used as a support for a variety of materials that can comprise the catalytic washcoat layer 120. For instance, in one example, the pass-through catalytic substrate 102 can be used to support a catalytic washcoat layer 120 that includes a three-way catalyst material that is used to process exhaust gases from gasoline powered vehicles. In another example, the pass-through catalytic substrate 102 can be used to support a catalytic washcoat layer 120 that includes a diesel oxidation catalyst that can be used in diesel engine after-treatment systems. In yet another example, the pass-through catalytic substrate 102 can be used to support a catalytic washcoat layer 120 that includes a selective catalytic reduction (SCR) catalyst for treatment of nitrogen oxide ($NO_x$).

The pass-through catalytic substrate 102 of the present disclosure can be used to help convert engine emissions into a less toxic substance. Moreover, pass-through catalytic substrates of the present disclosure can allow the pass-through catalytic substrate 102 to heat relatively quickly to a catalytic light-off temperature where the catalyst within the catalytic washcoat layer 120 more effectively converts engine emissions into a less toxic substance.

With regard to the present disclosure, it has been found that an increased porosity of the porous ceramic substrate walls 110 and the porous ceramic beveled corner portions 114, 214 along with the inclusion of the porous ceramic beveled corner portions 114, 214 in corners of the flow channels 108 can produce a number of advantages. The advantages include, but are not limited to, a reduction in total heat capacity of the pass-through catalytic substrate 102 and a reduction in the total amount of washcoat material used in the pass-through catalytic substrate 102. Increasing porosity and reducing the washcoat loading can both contribute to the reduction in total heat capacity. Reducing the heat capacity allows the pass-through catalytic substrate 102 to be quickly heated, thereby reducing the time necessary to reach the light-off temperature. Moreover, the reduction in washcoat material can reduce material costs while also contributing to a reduction in the total heat capacity of the pass-through catalytic substrate 102.

Figure 5:
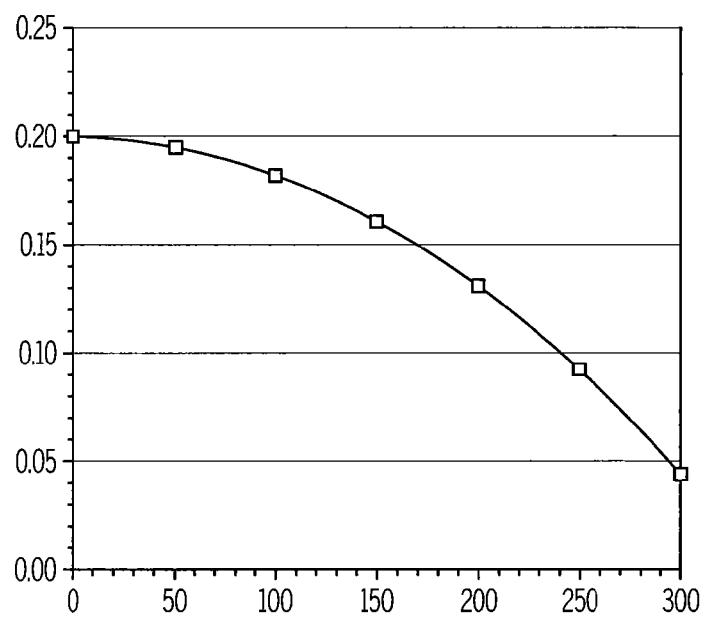
FIG. 5 is a plot of a loading of a washcoat on the pass-through catalytic substrate as a function of a radius of curvature of the beveled corner portion.

FIG. 5 a graph of modeled data wherein the Y-axis is a total washcoat loading ($g/cm^3$) and the X-axis is the radius of curvature "R" ($\mu m$) of the arcuate surface of the interior beveled surface 118 of the porous ceramic corner portions 114 illustrated in FIG. 3. As such, FIG. 5 shows a total washcoat loading ($g/cm^3$) of the catalytic washcoat layer 120 in the pass-through catalytic substrate 102 as a function of a radius of curvature ($\mu m$) of the arcuate surface of the porous ceramic beveled corner portions 114. The graph of FIG. 5 is based on modeled data of an example pass-through catalytic substrate 102 having a wall thickness of the porous ceramic substrate walls 110 of about 2.85 mils (72 $\mu m$) and a cell density of about 600 flow channels/$inch^2$. As shown, as the radius of curvature "R" of the arcuate surface 118 increases, the total washcoat loading in the pass-through catalytic substrate 102 will decrease. The reduction in washcoat loading is due, at least in part, to the porous ceramic beveled corner portions 114 occupying the corners of the flow channels 108. For instance, referring to FIG. 3, the catalytic washcoat layer 120 tends to accumulate at the intersecting corners of the porous ceramic substrate walls 110 within the flow channels 108 such that the thickness "T1" of the catalytic washcoat layer 120 within the intersecting corner is greater than the thickness "T2" of the washcoat layer 120 at an intermediate portion of the porous ceramic substrate walls 110.

The porous ceramic beveled corner portions 114 can therefore displace washcoat material that would normally have accumulated in the corner portions of the flow channels 108 in the absence of the porous ceramic beveled corner portions 114 (i.e., radius of curvature "R" of 0 $\mu m$). As such, the washcoat material is displaced from the corners towards the midpoint location of the porous ceramic substrate walls 110, i.e., the thickness of the region of the porous ceramic substrate walls 110 along the wall surfaces 116a, 116b as bounded by its intersection with the beveled surfaces 118, 218.

According to FIG. 5, the washcoat loading on the pass-through catalytic substrate 102 without porous ceramic beveled corner portions 114 (i.e., radius of curvature "R" of 0 $\mu m$) is about 0.2 $g/cm^3$. However, the washcoat loading drops to about 0.131 $g/cm^3$ for a radius of curvature of about 200 $\mu m$, a reduction in washcoat loading of about 34.5%. As such, providing the pass-through catalytic substrate 102 with porous ceramic beveled corner portions 114 can produce a lower washcoat loading. More specifically, the washcoat loading will progressively decrease in pass-through catalytic substrates 102 having porous ceramic beveled corner portions 114 having a larger radius of curvature. In one example, the washcoat material can account for about 42% of the heat capacity of the entire pass-through catalytic substrate 102 at a porosity of about 25%. Accordingly, this drop in total washcoat loading can reduce the overall heat capacity of the pass-through catalytic substrate 102, which, in turn, can allow for the effective temperature and light-off to be achieved faster. Still further, a drop in total washcoat loading can provide a significant cost reduction due since the components of the washcoat are typically expensive.

Figure 6:
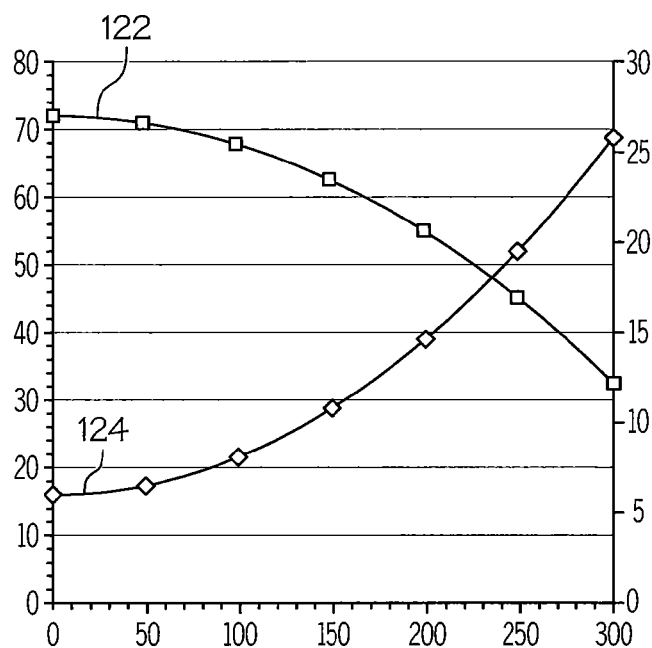
FIG. 6 is a first plot of a substrate wall thickness at a central portion of a substrate wall as a function of a radius of curvature of the beveled corner portion and a second plot of a washcoat thickness at the central portion of the substrate wall of the pass-through catalytic substrate as a function of the radius of curvature of the beveled corner portion.

Referring now to FIG. 6, a graph of modeled data is provided that illustrates two separate plots for an example pass-through catalytic substrate 102 having a cell density of about 600 flow channels/$inch^2$, a porosity of about 60%, and a washcoat loading of about 0.2 $g/cm^3$. The first plot 122 is presented with a substrate wall thickness ($\mu m$) is depicted on a primary Y-axis (left-most Y-axis) as a function of the radius of curvature ($\mu m$) of the arcuate surface of the porous ceramic beveled corner portions 114 depicted on the X-axis of the graph. As shown, as the radius of curvature "R" of the arcuate surface (shown in FIG. 3) increases, the cross-sectional thickness of the porous ceramic substrate walls 110 will decrease. In this example, the cross-sectional thickness of the porous ceramic substrate walls 110 is measured at a midpoint location of the porous ceramic substrate wall 110 roughly halfway between opposing corners of the porous ceramic substrate walls 110.

The reduction in the cross-sectional thickness of the porous ceramic substrate walls 110 is due, at least in part, to the presence of the porous ceramic beveled corner portions 114 occupying the corners of the flow channels 108. As will be described in more detail below, during an extruding process, ceramic-forming batch material that forms the porous ceramic substrate walls 110 can be partially diverted from the porous ceramic substrate walls 110 to fill in the corners of the flow channels 108 and form the porous ceramic beveled corner portions 114. This results in porous ceramic substrate walls 110 having a thinner cross-sectional thickness at the midpoint. Accordingly, as the radius of curvature of the arcuate surface increases, the porous ceramic beveled corner portions 114 can have a larger cross-sectional area, thus causing the cross-sectional thickness of the porous ceramic substrate walls 110 to decrease with the same amount of material used to extrude the substrate.

Referring still to FIG. 6, a second plot 124 is depicted on the graph that shows a thickness of the catalytic washcoat layer 120 ($\mu m$) on a secondary Y-axis (right-most Y-axis) as a function of the radius of curvature ($\mu m$) of the arcuate surface of the porous ceramic beveled corner portions 114 depicted on the X-axis of the graph. Again, the graph is based on an example pass-through catalytic substrate 102 having a cell density of about 600 flow channels/$inch^2$, a porosity of about 60%, and a washcoat loading of about 0.2 $g/cm^3$. As shown, as the radius of curvature "R" of the arcuate surface (shown in FIG. 3) increases, the washcoat thickness on the porous ceramic substrate walls 110 will also increase. In this example, the cross-sectional thickness of the catalytic washcoat layer 120 is measured at the midpoint location of the porous ceramic substrate wall 110 roughly halfway between opposing corners of the porous ceramic substrate walls 110.

The increase in the cross-sectional thickness of the catalytic washcoat layer 120 at the midpoint location of the porous ceramic substrate wall 110 is due, at least in part, to the presence of the porous ceramic beveled corner portions 114 occupying the corners of the flow channels 108. The porous ceramic beveled corner portions 114 can displace washcoat material that would have accumulated in the corner portions of the flow channels 108 in the absence of the porous ceramic beveled corner portions 114 (i.e., radius of curvature "R" of 0 µm). As a result, the porous ceramic beveled corner portions 114 induce the washcoat material to be redistributed from the corner portions of the flow channels 108 towards the midpoint location of the porous ceramic substrate wall 110. The washcoat material can therefore accumulate towards the midpoint location of the porous ceramic substrate wall 110, thus leading to a corresponding increased cross-sectional thickness of the washcoat layer 120. Accordingly, as the radius of curvature of the arcuate surface increases, the porous ceramic beveled corner portions 114 can have a larger cross-sectional area, thus causing a larger cross-sectional thickness of the washcoat layer 120 at the midpoint of the porous ceramic substrate wall 110. For example, in a pass-through catalytic substrate 102 having porous ceramic beveled corner portions 114 with an arcuate surface having a radius of curvature of about 150 µm, the cross-sectional thickness of the catalytic washcoat layer 120 at the midpoint location is about 85% greater as compared to a pass-through catalytic substrate 102 that does not have porous ceramic beveled corner portions 114.

As a result of displacing excess washcoat from the corners, the overall thickness profile of the washcoat layer 120 can be more uniform and therefore less washcoat is needed overall to achieve the desired washcoat layer thickness. In addition or alternatively, more of the washcoat material can be placed away from the corners of the flow channels 108, such that the washcoat material is more accessible to pollutant gases for improved catalytic conversion during steady-state and light-off. This can be due, at least in part, to the thinner porous ceramic substrate walls 110 at the midpoint location along with the thicker catalytic washcoat layer 120 with an increasing radius of curvature of the porous ceramic beveled corner portions 114.

Figure 7:
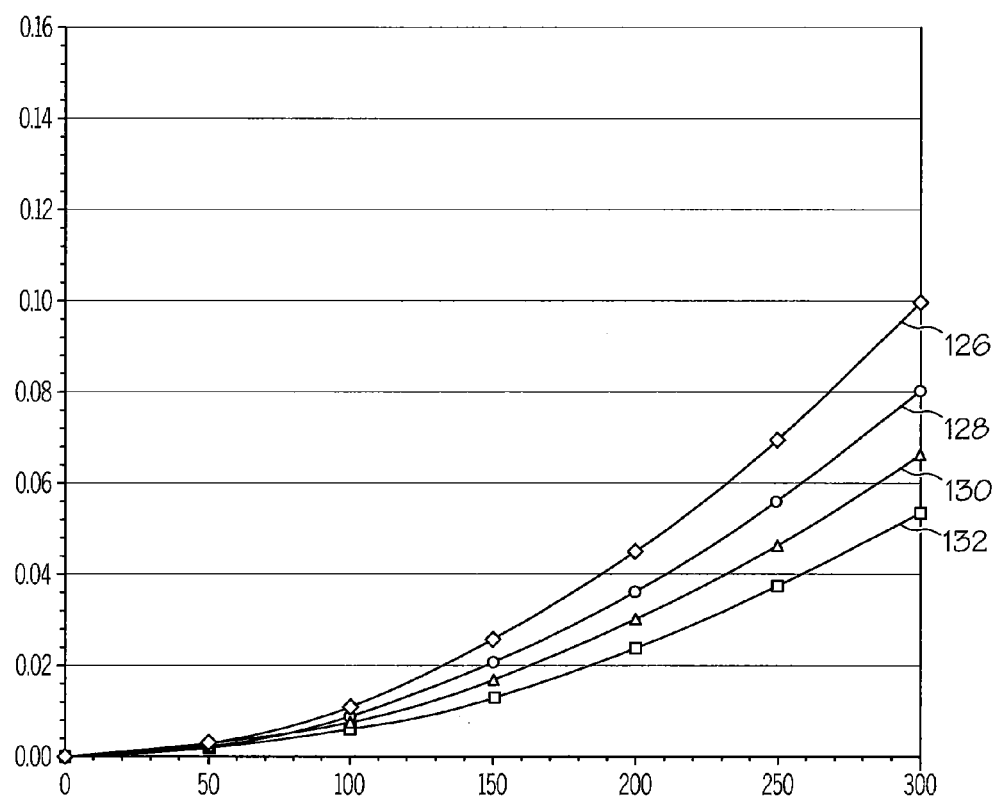
FIG. 7 illustrates plots of a heat capacity of the beveled corner portion in a pass-through catalytic substrate having a cell density of about 400 flow channels/inch$^2$ as a function of the radius of curvature of the beveled corner portion at porosities of about 25%, 40%, 50%, and 60%.

FIG. 7 shows a graph of modeled data for an example pass-through catalytic substrate 102 having a cell density of about 400 flow channels/inch$^2$, wherein the Y-axis comprises the heat capacity of the beveled corner portion (J/cm$^3$/K) and the X-axis comprises the radius of curvature "R" of the arcuate surface (µm). The graph depicts the heat capacity of the porous ceramic beveled corner portion 114 without the introduction of the catalytic washcoat layer 120. The graph of FIG. 7 is based on an example pass-through catalytic substrate 102 having a wall thickness of the porous ceramic substrate walls 110 of about 2.85 mils (72 µm). Moreover, the graph of FIG. 7 depicts four separate porosities of the porous ceramic beveled corner portion 114. The plot 126 represents a porous ceramic beveled corner portion with a porosity of 25%. The plot 128 represents a porous ceramic beveled corner portion with a porosity of 40%. The plot 130 represents a porous ceramic beveled corner portion with a porosity of 50%. The plot 132 represents a porous ceramic beveled corner portion with a porosity of and 60%.

As illustrated, as the radius of curvature "R" increases, the heat capacity of each of the porous ceramic beveled corner portions 114 will also increase. However, the heat capacity of the porous ceramic beveled corner portions 114 is lower with an increased porosity. For instance, the heat capacity is highest with a porosity of 25% represented by curve 126, and is nearly 0.10 J/cm$^3$/K in a pass-through catalytic substrate 102 having porous ceramic beveled corner portions 114 with a radius of curvature of about 300 µm. However, the heat capacity progressively decreases with an increased porosity: about 0.08 J/cm$^3$/K, about 0.07 J/cm$^3$/K, and about 0.05 J/cm$^3$/K for 40% porosity, 50% porosity, and 60% porosity, respectively, with a radius of curvature of 300 µm. Accordingly, providing an increased porosity can produce a reduction in the heat capacity of the porous ceramic beveled corner portions 114. In a further example, the porous ceramic beveled corner portions each include a porosity in a range of from about 50% to about 75% and a heat capacity in a range of from about 0.69 J/cm$^3$ K to about 1.38 J/cm$^3$ K.

Figure 8:
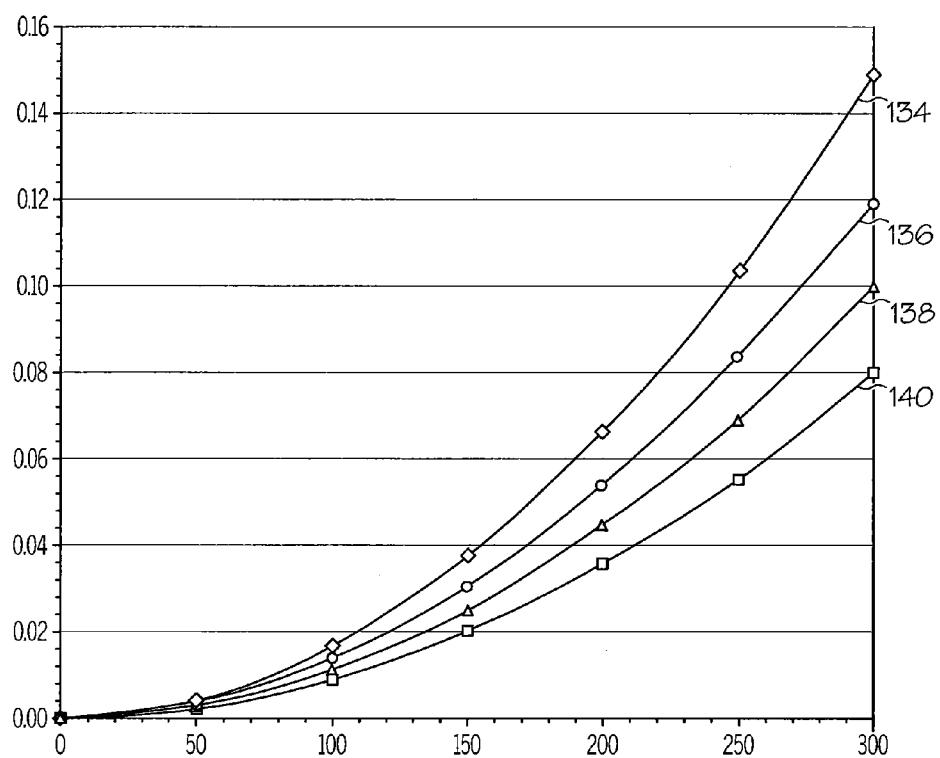
FIG. 8 illustrates plots of a heat capacity of the beveled corner portion in a pass-through catalytic substrate having a cell density of about 600 flow channels/inch$^2$ as a function of the radius of curvature of the beveled corner portion at porosities of about 25%, 40%, 50%, and 60%.

FIG. 8 shows another graph of modeled data for an example pass-through catalytic substrate 102 having a cell density of about 600 flow channels/inch$^2$, wherein the Y-axis comprises the heat capacity of the beveled corner portion (J/cm$^3$/K) and the X-axis comprises the radius of curvature "R" of the arcuate surface (µm). The graph depicts the heat capacity of the porous ceramic beveled corner portion 114 without the introduction of the catalytic washcoat layer 120. The graph of FIG. 8 is based on an example pass-through catalytic substrate 102 having a wall thickness of the porous ceramic substrate walls 110 of about 2.85 mils (72 µm). Moreover, the graph of FIG. 8 also depicts four separate porosities of the porous ceramic beveled corner portion 114. The plot 134 represents a porous ceramic beveled corner portion with a porosity of 25%. The plot 136 represents a porous ceramic beveled corner portion with a porosity of 40%. The plot 138 represents a porous ceramic beveled corner portion with a porosity of 50%. The plot 140 represents a porous ceramic beveled corner portion with a porosity of and 60%.

Similar to the graph shown in FIG. 7, the graph shown in FIG. 8 also demonstrates that as the radius of curvature "R" of the arcuate surface 118 increases, the heat capacity of each of the porous ceramic beveled corner portions 114 will also increase at a cell density of about 600 channels/inch$^2$. However, the heat capacity of the porous ceramic beveled corner portions 114 is likewise lower with an increased porosity. For instance, as shown by plot 134, the heat capacity is highest with a porosity of 25%, and is nearly 0.15 J/cm$^3$/K in the pass-through catalytic substrate 102 having porous ceramic beveled corner portions 114 with a radius of curvature of about 300 µm. However, the heat capacity progressively decreases with an increased porosity: about 0.12 J/cm$^3$/K, about 0.10 J/cm$^3$/K, and about 0.08 J/cm$^3$/K for 40% porosity, 50% porosity, and 60% porosity, respectively, with a radius of curvature of 300 µm. Accordingly, providing an increased porosity can produce a reduction in the heat capacity of the porous ceramic beveled corner portions 114 at cell densities of both 400 channels/inch$^2$ and 600 channels/inch$^2$. In a further example, the porous ceramic beveled corner portions each include a porosity in a range of from about 50% to about 75% and a corresponding heat capacity in a range of from about 0.69 J/cm$^3$/K to about 1.38 J/cm$^3$/K.

Figure 9:
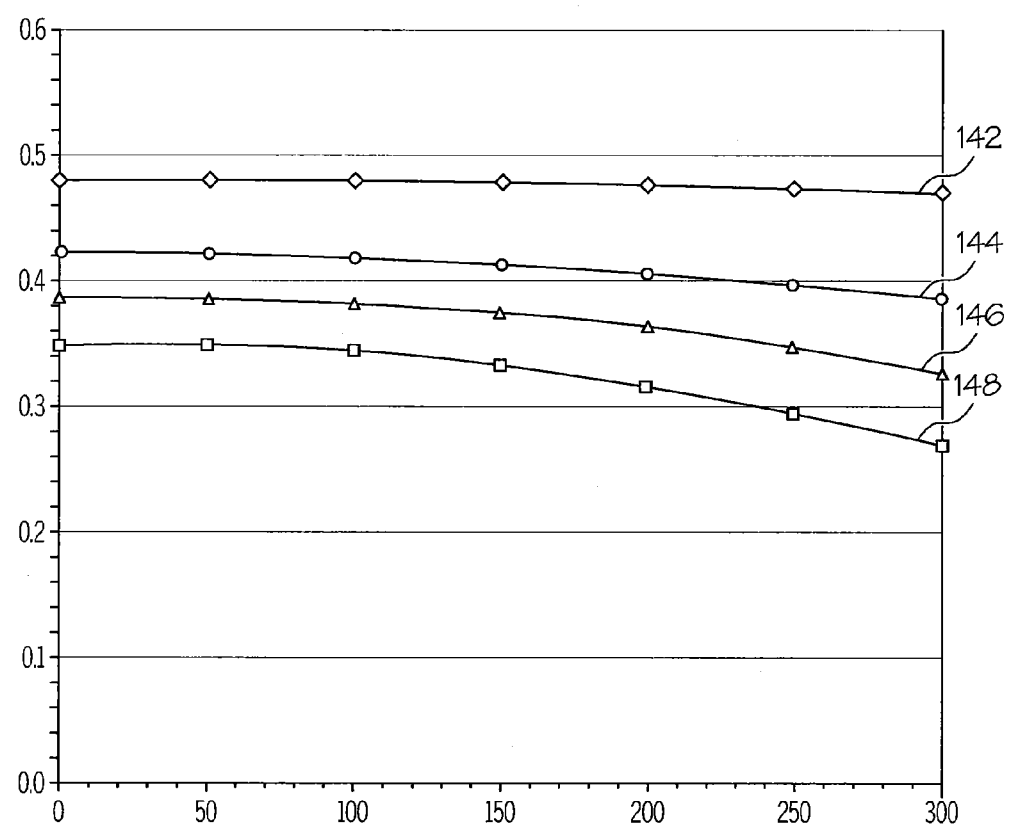
FIG. 9 illustrates plots of a total heat capacity of the pass-through catalytic substrate as a function of the radius of curvature of the beveled corner portion at porosities of about 25%, 40%, 50%, and 60%.

Referring now to FIG. 9, a graph of modeled data is illustrated depicting a total heat capacity (J/cm$^3$/K) of the pass-through catalytic substrate 102 as a function of a radius of curvature (µm) of the arcuate surface of the porous ceramic beveled corner portions 114. The Y-axis represents the total heat capacity (J/cm$^3$/K) of the pass-through catalytic substrate 102 including the catalytic material forming the catalytic washcoat layer 120. The X-axis represents the radius of curvature (µm) of the arcuate surface of the porous ceramic beveled corner portions 114. The graph of FIG. 9 is based on an example pass-through catalytic substrate 102 having a cell density of about 600 flow channels/inch². Furthermore, the graph includes plots based on a number of different porosities of the pass-through catalytic substrate 102, ranging from 25% to 60%. The plot 142 represents a porous ceramic beveled corner portion with a porosity of 25%. The plot 144 represents a porous ceramic beveled corner portion with a porosity of 40%. The plot 146 represents a porous ceramic beveled corner portion with a porosity of 50%. The plot 148 represents a porous ceramic beveled corner portion with a porosity of and 60%.

Referring first to the plot 142 depicting a pass-through catalytic substrate 102 having a porosity of 25%, the pass-through catalytic substrate 102 exhibits only a small decrease in total heat capacity as the radius of curvature of the arcuate surface is increased from 0 µm to 300 µm. In distinction, referring next to the plot 144 depicting a pass-through catalytic substrate 102 having a porosity of 40%, the pass-through catalytic substrate 102 exhibits a noticeable decrease in total heat capacity of the pass-through catalytic substrate 102. For instance, in a pass-through catalytic substrate 102 without a porous ceramic beveled corner portion 114 (i.e., radius of curvature of 0 µm), the total heat capacity is about 0.42 J/cm³/K while the total heat capacity is about 0.38 J/cm³/K with a radius of curvature of about 300 µm. Similarly, the total heat capacity will also show a progressively larger decrease with an increasing radius of curvature at porosities of 50% and 60% as respectively represented by plots 146, 148.

In one example, by providing a pass-through catalytic substrate 102 with porous ceramic beveled corner portions 114 having a radius of about 200 µm versus a pass-through catalytic substrate 102 with radius of curvature of 0 (i.e., no porous ceramic beveled corner portions 114), the total heat capacity of the pass-through catalytic substrate 102 with the porous ceramic beveled corner portions 114 can decrease from about 0.349 J/cm³/K to about 0.316 J/cm³/K, an improvement of about 10.2%. Accordingly, as the radius of curvature "R" of the arcuate surface increases, the total heat capacity of the pass-through catalytic substrate 102 will decrease, with the decrease being more significant at higher porosities. This decrease can be attributed, at least in part, to the porous ceramic beveled corner portions 114 occupying the corners of the flow channels 108. The porous ceramic beveled corner portions 114 can displace washcoat material that would have accumulated in the corner portions of the flow channels 108 in the absence of the porous ceramic beveled corner portions 114. Since the washcoat material has a higher heat capacity than the porous ceramic beveled corner portions 114, a replacement of the washcoat material in the corners of the flow channels 108 with the high porosity beveled corner portions can lead to a decrease in total heat capacity. This decrease in total heat capacity can be beneficial because the pass-through catalytic substrate may be able to reach a desired light-off temperature in less time.

With reference still to FIG. 9, Table 1 (shown below) presents data relating to heat capacities of materials that can be used in one example of the pass-through catalytic substrate 102. In the example of Table 1, the composition of the catalytic washcoat layer 120 can be about 75% alumina, 21% ceria zirconia, and 3-4% of precious metals. As shown, the heat capacity of the substrate (cordierite in this example) represents about 58% of the heat capacity of the entire pass-through catalytic substrate 102. However, increasing the porosity of the substrate from 25% to 55% can lower the heat capacity of the entire pass-through catalytic substrate 102 from about 0.479 J/cm³ K (see 25% porosity plot curve 142 in FIG. 9) to about 0.365 J/cm³ K, a reduction of about 24%.

TABLE 1

| Material | Material Density (g/cm³) | Heat Capacity (J/g K) | Heat Capacity (J/cm³ K) | Density substrate 600 cells/in² 2.85 mil wall (g/cm³) | Heat Capacity (J/cm³ K) |
|---|---|---|---|---|---|
| Cordierite (substrate) | 2.51 | 1.10 | 2.76 | 0.254 (25% porosity) | 0.279 (25% porosity) |
| γ-alumina | 3.96 | 1.13 | 4.47 | 0.2 | 0.2 |
| Ceria-Zirconia | 5.9 | 0.6 | 3.54 | | |
| Platinum | 21.4 | 0.13 | 2.78 | | |
| Rhodium | 12.4 | 0.24 | 3.00 | | |
| Palladium | 12 | 0.24 | 2.88 | | |

Figure 10:
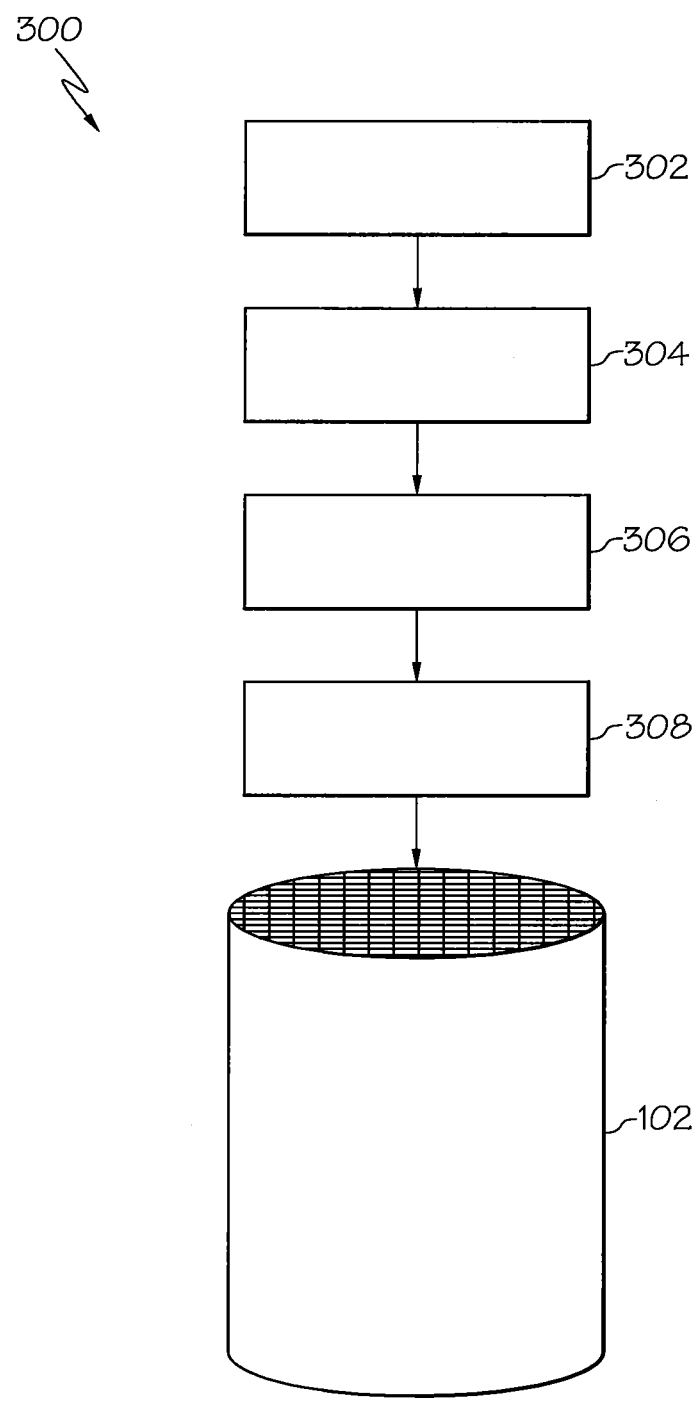
FIG. 10 depicts a method of making a porous pass-through catalytic substrate in accordance with example aspects of the disclosure.
Figure 11:
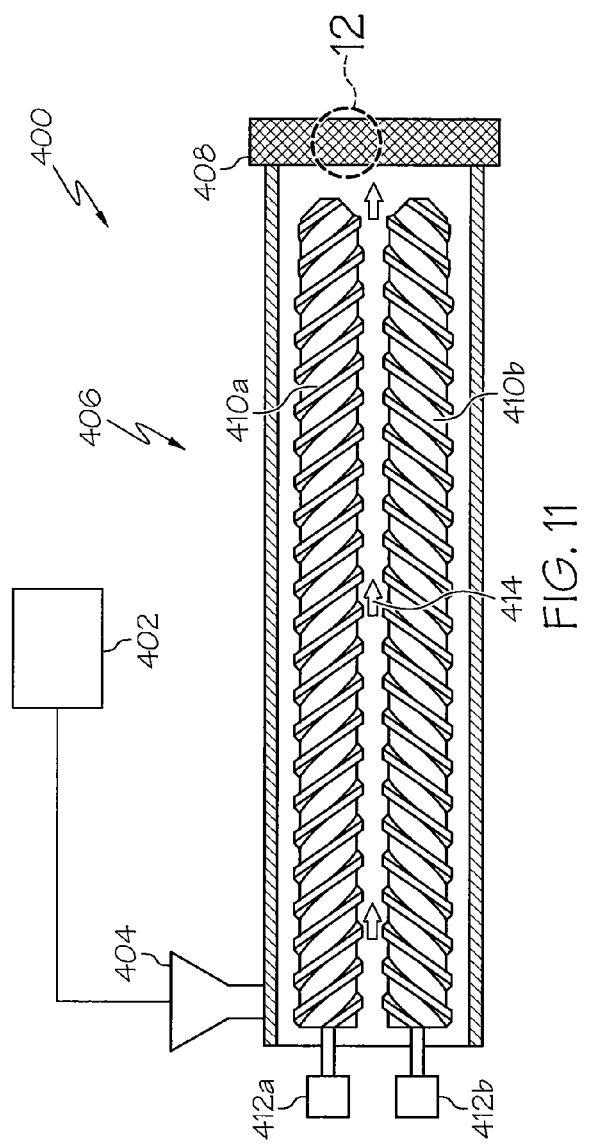
FIG. 11 is a schematic view of an extrusion apparatus in accordance with aspects of the disclosure.
Figure 12:
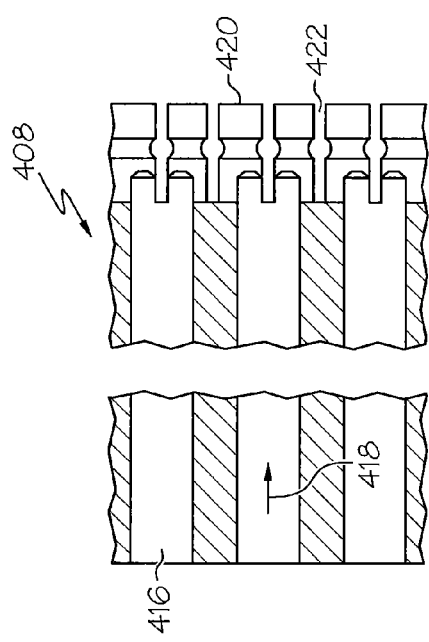
FIG. 12 is an enlarged partial schematic sectional view of an example die member taken at view 12 of FIG. 11.

Turning now to FIG. 10, a method 300 of making the pass-through catalytic substrate 102 is shown while FIGS. 11 and 12 illustrate schematic features of an example apparatus 400 for producing an extruded honeycomb substrate using the method 300. As shown in FIG. 10, the method 300 can include the step 302 of providing a batch of ceramic-forming batch material. For example, FIG. 11 shows a schematic illustration of a batch 402 of ceramic forming material. The batch material 402 can then be introduced into an input portion 404 of an extruding device 406.

The method 300 can then include step 304 of extruding the ceramic-forming batch material to form a ceramic-forming substrate 304. For example, as shown in FIG. 11, the extruding device 406 is configured to extrude a batch of the ceramic-forming batch material through a die member 408 to form a ceramic-forming substrate of potentially unlimited length. Once the desired length is achieved, a cutter (not shown) can be used to sever the extruded ceramic-forming substrate to provide the substrate with the desired length.

As shown, in one example, the extruding device 406 can include a twin-screw extruder including twin screws 410a, 410b configured to be rotated by respective motors 412a, 412b to mix and compress the batch of ceramic-forming batch material as it travels along a path 414 toward the die member 408. The extruding device 406 includes an extrusion axis wherein the ceramic-forming substrate can be extruded from the die member 408 along an extrusion direction substantially parallel to the extrusion axis.

FIG. 12 is an enlarged schematic cross sectional view of an example die member 408 taken at view 12 of FIG. 11 that may be used in accordance with aspects of the disclosure. As shown, the die member 408 includes feed holes 416 configured to feed batch material in direction 418, along the path 414, toward a plurality of die pins 420. The die pins 420 are spaced apart from one another to define slots 422 designed to form the porous ceramic substrate walls 110 of the pass-through catalytic substrate 102 (best seen in FIG. 2) as the ceramic-forming batch material is drawn into the extruded ceramic-forming substrate with the honeycomb cross-section illustrated in FIG. 2.

The die pins 420 shown in FIG. 12 can, in one example, have a square shape to define square-shaped flow channels 108 (best seen in FIG. 2) although other die pin configurations (e.g., triangular, hexagonal, octagonal, etc.) can be selected depending on the desired channel configuration. For instance, in one example, the die pins 420 can include beveled, such as substantially rounded corner portions that can produce the porous ceramic beveled corner portions 114, 214 discussed above. In one example, the die pins 420 can include a convex radius of curvature in a range of from about 40 μm to about 400 μm. In yet another example, the die pins 420 could include flat chamfered portions to produces the flat interior beveled surface 218 of the porous ceramic beveled corner portion 214. In further examples, the die pins 420 may have other corner configurations designed to provide the desired interior beveled surface of the porous ceramic beveled corner portions.

Turning back to FIG. 10, the method 300 can further include the step 306 of firing the ceramic-forming substrate into a porous ceramic substrate 306. In one example, the step 302 of providing the batch material may provide the batch material with a pore forming material to achieve the desired porosity in the pass-through catalytic substrate 102. The pore forming material can include a number of different organic materials or compositions, and, in one example, can include starch. The pore forming material can be burned out during the firing step to generate the pores in the porous ceramic substrate. The desired porosity of the pass-through catalytic substrate 102 can be controlled, at least in part, by the amount of pore forming material provided in the ceramic-forming batch material. For instance, the porosity of the pass-through catalytic substrate 102 can be in a range of about 50% to about 75% or, more particularly, in the range of from about 55% to about 65%. Additionally, the pass-through catalytic substrate 102 can be formed with a pore distribution having a median pore size in a range of from about 0.5 μm to about 7 μm or, more particularly, in the range of from about 1 μm to about 5 μm.

The method 300 can also include the step 308 of coating the porous ceramic substrate walls 110 and porous ceramic beveled corner portions 114, 214 with a catalytic washcoat layer 120 to achieve the pass-through catalytic substrate 102 illustrated in FIG. 1. The catalytic washcoat layer 120 can be applied in a number of ways. For instance, in one example, the porous ceramic substrate can be introduced into a slurry comprised of a desired catalyst washcoat. The slurry can contain, for example, precious metals including, but not limited to, alumina, ceria-zirconia, platinum, rhodium, and palladium. In one example, the catalyst washcoat could include about 75% alumina, 21% ceria zirconia, and 3-4% of precious metals. After infiltration of the catalyst washcoat, the porous ceramic substrate can be agitated to remove excess washcoat material. After drying, the pass-through catalytic substrate 102 is provided with the catalytic washcoat layer 120 forming a coating on the porous ceramic substrate walls 110 and the porous ceramic beveled corner portions 114, 214.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of making a catalytic substrate comprising the steps of:
    extruding a ceramic-forming batch material through a die to form a ceramic-forming substrate including a plurality of substrate walls defining flow channels extending between an inlet end and an outlet end of the ceramic-forming substrate, wherein a plurality of beveled corner portions are coextruded with the plurality of substrate walls;
    firing the ceramic-forming substrate into a porous ceramic substrate, wherein the beveled corner portions comprise porous ceramic including a heat capacity less than about 1.38 J/cm$^3$/K; and
    coating the porous ceramic substrate walls and the porous ceramic beveled corner portions with a catalytic washcoat layer.

2. The method of claim 1, wherein the porous ceramic beveled corner portions of the porous ceramic substrate are formed to include a substantially planar surface extending between intersecting porous ceramic substrate walls.

3. The method of claim 1, wherein the porous ceramic beveled corner portions of the porous ceramic substrate are formed to include an arcuate surface having a radius of curvature.

4. The method of claim 3, wherein the arcuate surface is formed with the radius of curvature in a range of from about 40 μm to about 400 μm.

5. The method of claim 1, wherein the porous ceramic beveled corner portions are provided with a porosity in a range of from about 55% to about 65%.

6. The method of claim 1, wherein the porous ceramic beveled corner portions are provided with a pore distribution with a median pore size in a range of from about 0.5 μm to about 7 μm.

7. The method of claim 6, wherein the median pore size is provided in the range of from about 1 μm to about 5 μm.

8. The method of claim 1, wherein a central portion of a plurality of the porous ceramic substrate walls are each provided with a cross-sectional wall thickness in a range of from about 30 μm to about 150 μm.

9. The method of claim 8, wherein the cross-sectional wall thickness is provided in the range of from about 50 μm to about 100 μm.

* * * * *